United States Patent [19]

Ricci

[11] Patent Number: 4,799,409
[45] Date of Patent: Jan. 24, 1989

[54] PORTABLE END PREPARATION APPARATUS

[76] Inventor: Donato L. Ricci, 834 Spring Creek Rd., Red Wing, Minn. 55066

[21] Appl. No.: 139,194

[22] Filed: Dec. 29, 1987

[51] Int. Cl.⁴ ............................................. B23B 3/22
[52] U.S. Cl. .................................. 82/4 C; 82/4 R; 82/2 R
[58] Field of Search .............. 82/4 C, 4 R, 2 E, 2 R, 82/2 B, 2 C, 2 D, 4 D, 4 A, 4 B, 4 E

[56] References Cited

U.S. PATENT DOCUMENTS 3,717,055 2/1973 Pendleton ........................... 82/4 C
4,493,232 1/1985 Nall ..................................... 82/4 C

*Primary Examiner*—Frederick R. Schmidt
*Assistant Examiner*—Lawrence Cruz
*Attorney, Agent, or Firm*—Merchant, Gould, Smith, Edell, Welter & Schmidt

[57] ABSTRACT

The present invention comprises a portable end preparation apparatus having a housing 11 and motor 15 cooperatively connected to the housing. A mandrel 29 is positioned in the housing. A rotating drive member 41 is rotatably mounted on the mandrel 29 and includes a bull gear 50, base member cooperatively connected to the bull gear and a head member 52 releasably and cooperatively connected to the base member 42. Further, a tool module 58 is releasably mounted on the head member 52. The apparatus 10 may also include extension members 56 and a thrust bearing 80. Still further, the apparatus 10 allows for up to a five degree tilt of the mandrel assembly 29.

3 Claims, 4 Drawing Sheets ent invention.
PORTABLE END PREPARATION APPARATUS

FIELD OF THE INVENTION

This invention relates generally to a portable pipe end preparation apparatus and more particularly to a pipe end preparation apparatus which incorporates several novel features to result in an improved apparatus.

DESCRIPTION OF THE PRIOR ART

The general concept of a portable pipe end preparation apparatus is known in the art. However, the prior art apparatuses have several disadvantages associated with them. Typically, the rotating head portion of the apparatus is an integral portion of the apparatus and is not separately detachable. Accordingly, if there are problems or breakdowns with the head, it is necessary to replace a major portion of the apparatus.

In addition, the apparatus are typically made for use with a certain size pipe. There is no adjustment or extension features available for utilizing one apparatus for various sizes of pipe.

Still further, the prior art devices do not use a replaceable thrust bearing between the end of the mandrel and the housing to preload the apparatus. Finally, the present apparatus also includes a novel mechanism for allowing the mandrel of the apparatus to be tilted so that a miter may be effectively placed on the end of the pipe being prepared.

The portable pipe end preparation apparatuses are often used in an environment, such as in a nuclear reactor plant, where it is of the utmost importance to minimize the amount of time that the operator is on the job site. By minimizing the amount of time, the amount of radiation that an operator receives is reduced. The present invention addresses the problems associated with the prior art devices and provides for a new and improved portable pipe end preparation apparatus.

SUMMARY OF THE INVENTION

The present invention provides for a portable pipe end preparation apparatus having a housing having a motor access opening and a central bore. A motor is cooperatively connected to the housing and the motor has a pinion for imparting a driving force. A stationary mandrel assembly is positioned in the central bore and the mandrel assembly has a baseplate. The baseplate has means to secure the baseplate to an inner diameter of a pipe. A rotating drive member is rotatably mounted on the mandrel section. The drive member includes a bull gear positioned to engage the pinion gear, the bull gear encircling the mandrel section. A base member is cooperatively connected to the bull gear and first bearing means are positioned between the mandrel section and the base member. A head member is releasably and cooperatively connected to the base member. A second bearing means is positioned between the drive member and the housing. A tool module is releasably mounted to the head member.

In a preferred embodiment, the apparatus may also include an extension member releasably and cooperatively connected to the head member. Still further, the apparatus may include a replaceable thrust bearing positioned between the housing and the base member, whereby the apparatus may be adjusted by replacing the thrust bearing.

In a preferred embodiment, the apparatus may also include a mandrel assembly which is tiltable. The mandrel assembly includes a baseplate having a bore formed therein. A spherical member, having a central bore, is position on the baseplate. A cylindrical shaft is positioned in the bore of the baseplate. The cylindrical shaft also having a bore. A cylindrical sleeve is mounted for rotation on the spherical member. The inner diameter of the sleeve is less than that of the spherical member. Accordingly, the sleeve is rotatable in the spherical member. A rod, having a first end and enlarged second end is positioned in the bore of the cylindrical shaft. The enlarged end prevents the rod from exiting the bore of the cylindrical shaft. Also included is a mandrel section having a flange. The flange is cooperatively connected to the baseplate and the flange of the mandrel section has an inner opening which is positioned on the cylindrical sleeve, whereby tilting of the sleeve results in tilting of the mandrel section.

DETAILED DESCRIPTION OF THE INVENTION

Figure 1:
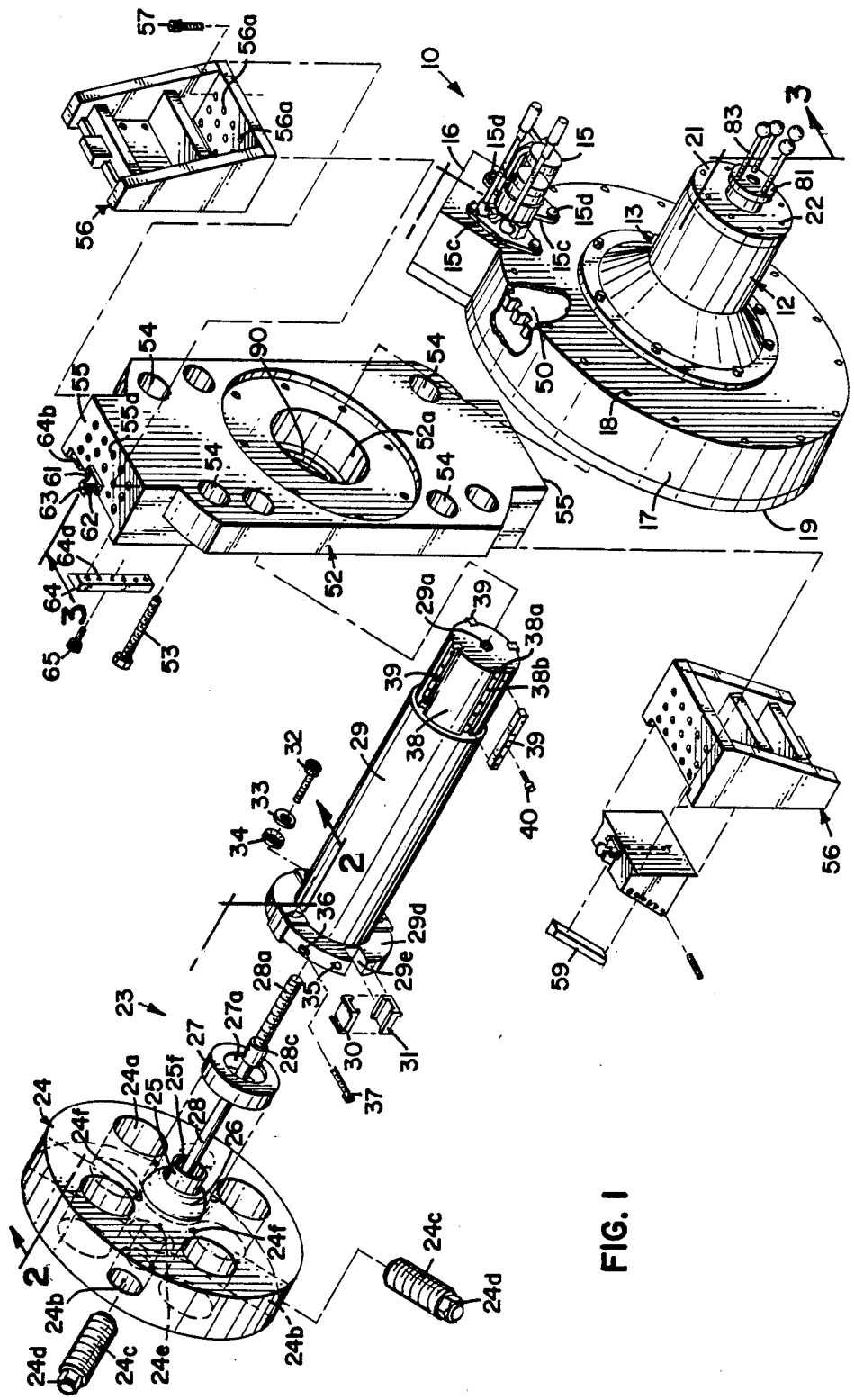
FIG. 1 is an exploded perspective view of the portable pipe end preparation apparatus embodying the present invention.

Referring to the figures, wherein like numerals represent like parts throughout the several views, there is generally illustrated at 10 a portable pipe end preparation apparatus. The apparatus 10 includes a housing, generally designated as 11. The housing 11 includes a conical section 12, having an upper cylindrical portion 12a and a lower conical section 12b. The conical section 12b has an outer flange through which a plurality of holes are formed. Bolts 13 are used to cooperatively connect the conical section 12b to the disk shaped top section 14. The top section 14 has a motor access opening 14a through which a motor 15 may be mounted. The motor 15 may be any suitable motor such as a hydraulic motor. The motor 15 has a rotating shaft 15a to which is cooperatively connected a pinion gear 15b. The motor 15 is mounted so that the shaft 15a and pinion gear 15b are placed through the motor access opening 14a. The motor 15 is secured to the top section 14 and motor housing 15 by means of plates 15c through which bolts 15d are inserted. Other suitable mounting techniques, known in the industry, may be utilized. In a preferred embodiment, two motors 15 are utilized to impart the driving force for the apparatus. A motor housing 16 is cooperatively connected, by any suitable means well known in the art, to the housing 11. The top section 14 has a downwardly depending side section 17 cooperatively connected thereto by means of a weld or other suitable means. A bottom plate section 19 is cooperatively connected to the side section 17 by means of bolts 18. The bottom plate section 19 is in the shape of a disk and has a central opening. The housing 11 also includes a cap 21, having a central opening 21a. The cap 21 is cooperatively connected to the cylindrical portion 12a by means of bolts 22. The cylindrical portion 12a defines a central bore 12c.

Figure 2:
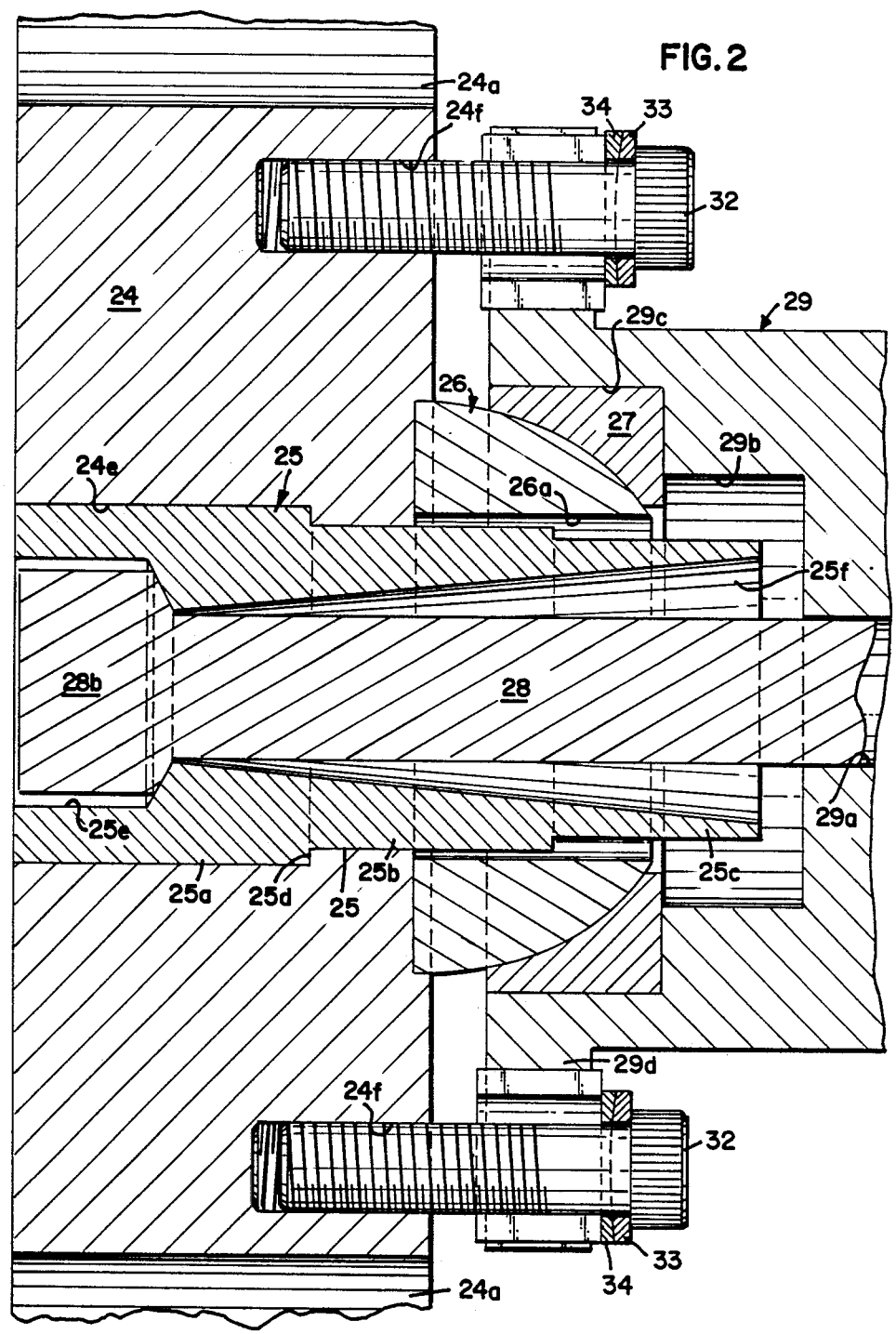
FIG. 2 is a cross-sectional view of the apparatus of FIG. 1, taken generally along the lines 2—2.

The apparatus 10 also includes a mandrel assembly 23. The mandrel assembly 23 has a circular baseplate 24, a plurality of circular bores 24a are drilled throughout the baseplate 24 to lighten the overall weight of the baseplate 24. The baseplate 24 also has a number of holes, and as shown in the preferred embodiment, the four threaded mounting holes 24b bored into the side section of the baseplate 24. Into each mounting hole 24b, a threaded shaft 24c is inserted. At the end of each threaded shaft 24c is formed a nut 24d which may be utilized to move the threaded shaft 24c in and out of the mounting holes 24b. The baseplate 24 has a stepped central bore 24e. A cylindrical shaft 25 is inserted into the stepped central bore 24e. The cylindrical shaft 25 has a base section 25a, middle section 25b and top section 25c. The base section 25a has a slightly larger diameter than the middle section 25b, which in turn has a slightly larger diameter than the top section 25c. The intersection between the base section 25a and middle section 25b forms a shoulder 25d which engages the stepped central bore 24e, thereby locking the shaft 25 in position in the baseplate 24. A truncated spherical member 26 having a bore 26a is positioned on top of the baseplate 24. Further, the baseplate 24 has a small circular indentation into which the bottom portion of the spherical member 26 is positioned. The cylindrical shaft 25 extends up through the bore 26a. A cylindrical sleeve 27 having a bore 27a is positioned on the outer surface of the spherical member 26 and is rotatable thereon. A rod 28 has a first end 28a which is threaded and a second end 28b which has an enlarged end configuration substantially the same in shape but slightly smaller is size than that of the inner cavity 25e. The diameter of the second end 28b is slightly less than the diameter of the inner cavity 25e to allow for tilting. When the rod 28 tilts, the second end 28b is free to tilt within the inner cavity 25e. The present apparatus is designed to allow up to a five degree tilt. A mandrel section 29 is generally cylindrical and has a longitudinal bore 29a. The bore 29a is sized so that the rod 28 is positioned in the bore 29a. However, the bore 29a also has an enlarged middle section 29b to accommodate the upper portion of the cylindrical shaft 25. Still further, the bore has an enlarged lower section 29c which is sized to accommodate the cylindrical sleeve 27. The cylindrical shaft 25 has a bore 25f which extends through all three of the sections 25a through c. The base section 25a has a further inner cavity 25e which is larger than the bore 25f. The inner cavity 25e has a larger cylindrical bore which tapers to match the diamter of the bore 25f. Further, as can be seen in FIG. 2, the bore 25f then increases in diameter as the bore extends up through the sections 25a through c. At the bottom of the mandrel section 29 is a base flange 29d having four cut out slots 29e. The slots are positioned above the holes 24f of baseplate 24. Clip 30 and clip 31 are inserted into the slot 29e to form a guide for bolt 32 which is used to secure the base flange 29d to the baseplate 24. Positioned between the bolt head and the clip 30 and 31 are two washers 33 and 34. Washer 33 has a convex bottom surface and washer 34 has a concave upper surface. In the base flange 29b is a horizontal bore 35 which extends from the clip 31 and a horizontal bore 36 which extends to the clip 30. Screws 37 are inserted into each of the bores 35 and 36 and tightened against the clips to further secure the bolts 32 against movement after they have been inserted into the baseplate 24. The mandrel section 29 has an upper portion 38 which has a slightly smaller diameter than the main mandrel section 29. Four slots 38a are provided with a series of screw holes 38b. A key 39 is fastened into each of the slots 38a by means of screws 40.

As will be more fully explained hereafter, the mandrel section 29 is able to tip on the spherical member 26 to a desired degree of tilt and then securely fastened to the baseplate 24.

Figure 3:
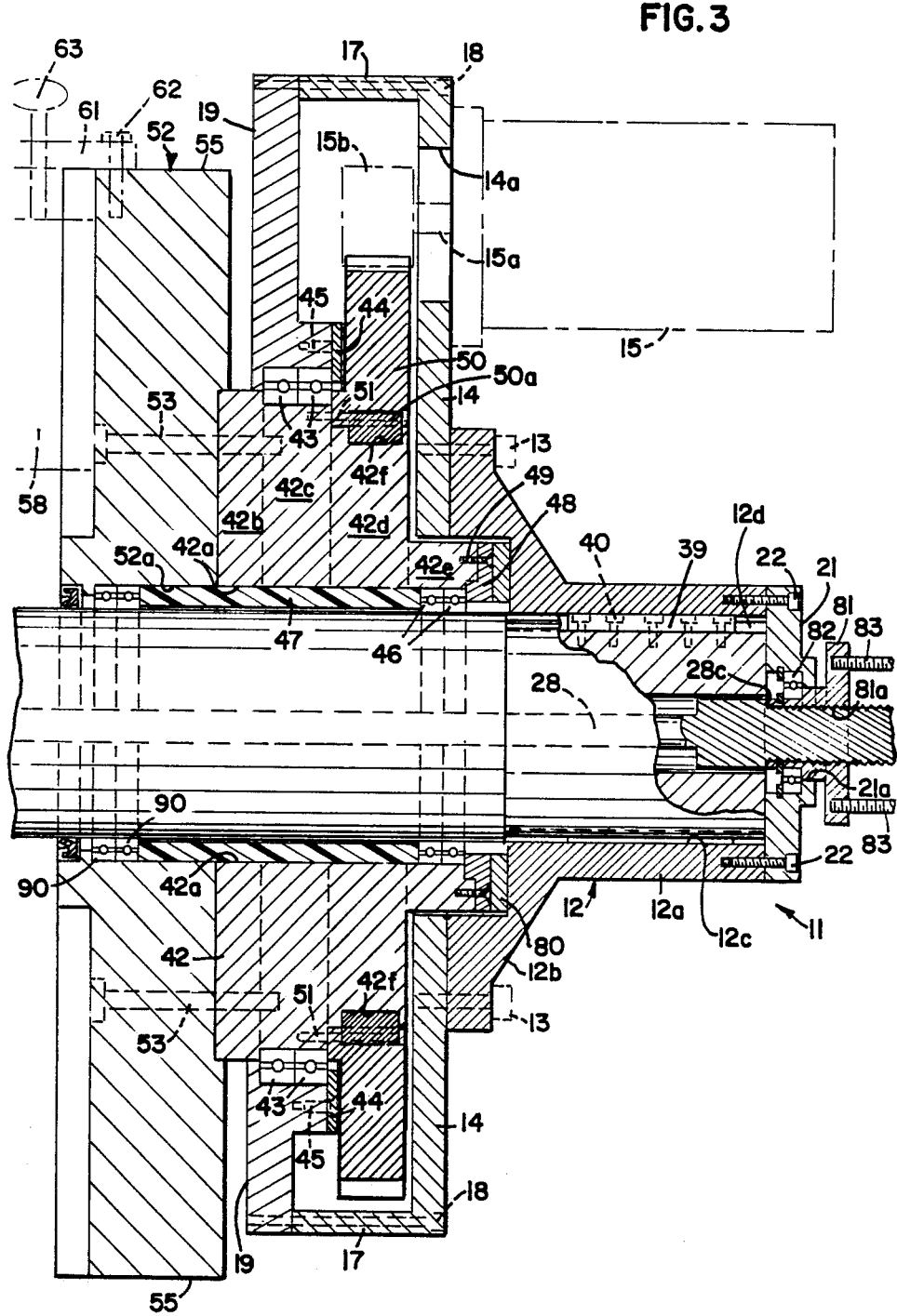
FIG. 3 is a cross-sectional view of the apparatus of FIG. 1, taken generally along the lines 3—3.

The apparatus 10 also includes a rotating drive member generally designated as 41. The drive member 41 includes a base member 42 which is in the general shape of a cylinder having varying diameters. The base member 42 has a bore 42a extending therethrough. As can be seen in FIG. 3, the four sections of varying diameter are 42b, 42c, 42d and 42e. Even through the diameters vary, all four sections are formed from a single piece of extruded aluminum material. Section 42d has a key way 42f formed therein. Circular bearings 43 are positioned around the section 42c. The bearings 43 are also positioned proximate a portion of the bottom plate section 19 and a retainer plate 44, secured by screws 45, is secured to the top portion of the plate section 19 and also over the bearings 43. A top set of bearings 46 are placed around the inner diameter of the section 42e. A cylindrical urethane spacer 47 is pressed into a snug fit around the bore 42a. The circular retaining plate 48 is held in place by screws 49 which go into the section 42e and retain the top set of bearings 46. A circular thrust bearing 80 is easily replaceable by simply removing the bolts 13 in the housing 11. The thrust bearing may be replaced by different thicknesses of thrust bearings depending upon the amount of wear in the apparatus 10. This replaceable thrust bearing provides an easy means of adjusting the apparatus due to wear because of usage. A circular bull gear 50 is positioned around section 42d. The bull gear 50 is held in position by means of a key 50a which engages the key way 42f and also by means of a plurality of screws 51 which pass through the bull gear 50 and into the section 42c. The thrust bearing 80 is easily replaceable and, if due to wear of the apparatus 10, it is necessary to make an adjustment, the bearing 80 may be easily replaced. It is a relatively minor operation to replace the bearing with either a thicker or thinner bearing and thereby avoid having the rework the entire machine due to wear and tear. This provides an easy way to adjust the apparatus in a field situation. On critical path maintenance projects, it is necessary to solve any problems immediately without waste of time. Being able to allow for an adjustable thrust bearing is one means to reduce any down time.

In addition, critical time is also saved if there is a problem with the head member 52. It is only necessary to unbolt the bolts 53 and replace a new head unit. It is not necessary to install a completely new apparatus 10, with the necessary adjustments of the baseplate 24 inside of the pipe.

The rotating drive member also includes a head member 52 releasably and cooperatively connected to the base member 42. The head member 52 is cooperatively connected to the base member 42 by means of a plurality of bolts 53. The head member 52 has an inner bore 52a such that the circular spacer 47 is a snug fit inside of the bore 52a. In addition, a lower set of circular bearings 90 is mounted by a snug fit in the bore 52a.

A plurality of holes 54 are spaced throughout the head 52 simply to lighten the overall weight. The head member 52 has two end sections through which a plurality of screw holes 55a are formed. As will be more fully described hereinafter, the screw holes are used to mount an extension member 56. Extension member 56 is cooperatively connected to the end section 55 by means of a plurality of screws 57 entering through screw holes 56a in the extension member 56 and being cooperatively connected to the end section 55 through screw holes 55a.

Figure 4:
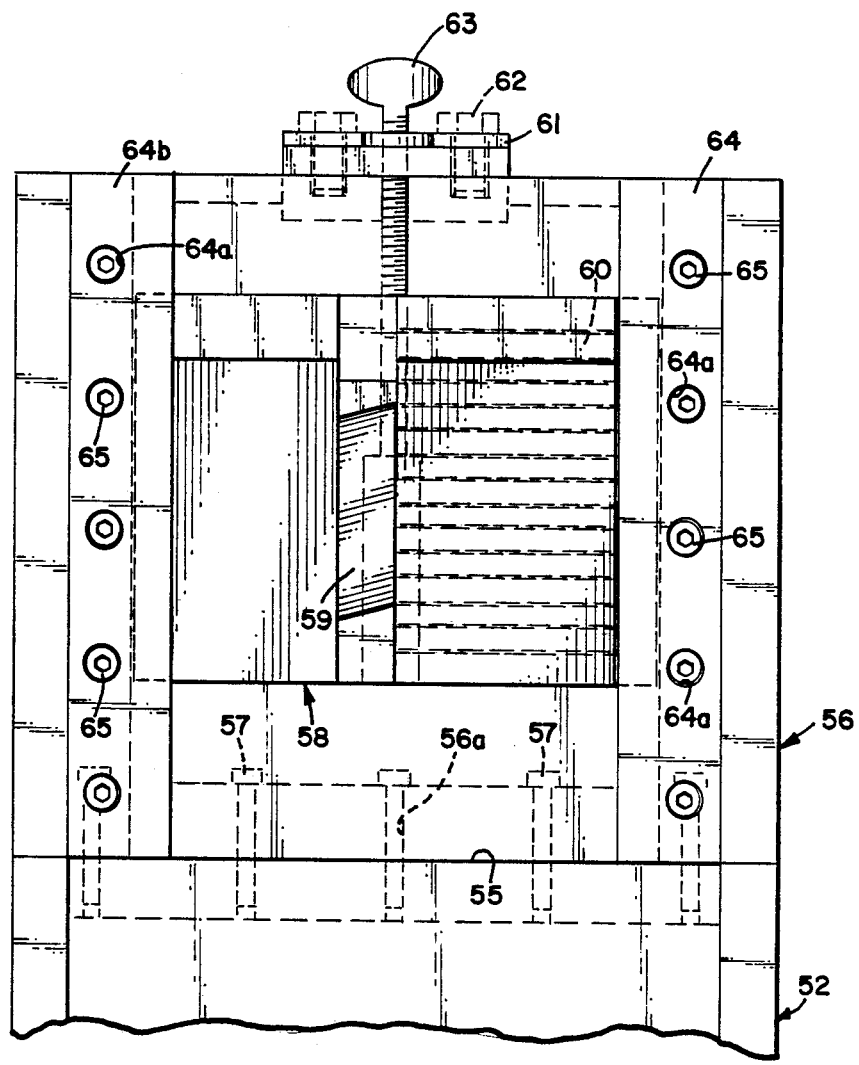
FIG. 4 is a partial top plan view of the head member of the apparatus shown in FIG. 1 with the addition of an extension member.

When the extension member 56 is used, one is used on each end of the head member 52. The working surface of the head 52 and the extension 56 is more clearly shown in figure 4. However, in FIG. 1, the U-shaped channel that is formed on the working surface is shown. As can be seen, the base of the tool module 58 has two upwardly and inwardly sloping sidewalls before proceeding generally upward. Two gib members 64 and 64b are secured to the working surface of the head 52 by means of screws 65 which go through holes 64a into the working surface. The gib 64 has an upwardly and inwardly sloping inside surface. Gib 64b is a mirror image of gib 64. The gibs 64 and 64b accordingly made a profile which is similar to the profile of the base of the tool module 58. The tool module 58 is then slid into position between the gibs before the screws 65 are completely tightened. Once in position, the screws 65 are then tightened. If the extension member 56 is utilized, it is secured to the end section 55 and the tool module 58 is then similarly attached to the extension module 56. As shown in FIG. 4, the mounting bracket 62 is secured to the extension member 56 by means of screws 62. The tool module 58 may be moved to various positions along the working surface by simply rotating the threaded shaft 63. The threaded shaft is connected at one end 63a to the tool module 58. Then, by means well known in the art, shaft 63 is rotated, causing movement of the tool module 58 along the longitudinal axis of the threaded shaft 63. Shown in phantom in FIG. 4 is the tool 59. Accordingly, movement of the tool module 58 causes movement of the tool 59, so that the cut being made by the tool 59 may be adjusted by simply rotating the shaft 63.

The first end 28a of the rod 28 is threaded. Further, just prior to the beginning of the threads, a shoulder is formed therein. The threaded end 28a is positioned in a rotatable handle member 81. The handle 81 has a threaded shaft 81a. The rod 28 is shown, in FIG. 3, in its fully drawn up position, wherein the shoulder 28c comes in contact with bearings 82. The bearings 82 are located between the handle 81 and the cap 21. The bearing 82 is a circular bearing and extends around the handle 81. The handle 81 is free to rotate, but because of the bearings, cannot go into the housing 11. Accordingly, the threaded shaft 81a of the handle 81 causes the housing 11 and rotating drive member 41 to be moved along the longitudinal axis of the shaft 28.

Handle extensions 83 may be utilized to assist in the rotation of the handle 21.

In operation, the apparatus 10 is brought on site to the pipe (not shown) which needs to be prepared. With the present apparatus, it is possible to apply a bevel, miter or ream cut to the pipe. First the cylindrical shaft 25 is inserted into the bore 24e, and then the first end 28a of the rod 28 is inserted through the cylindrical shaft 25 up through the baseplate 24 and the threaded shafts 24c are mounted into their respective holes to a diameter less than the inside diameter of the pipe. Then once in position, the nut 24d is rotated to bring the shaft 24c in engagement with the inside diameter of the pipe and firmly position the baseplate 24. A suitable calibration instrument is placed on the baseplate 24 to assure that the base is properly aligned with respect to the pipe being worked on. When the cylindrical shaft 25 was inserted, the spherical member 26 was already in position. The, the cylindrical sleeve 27 is placed over the rod 28 and is free to rotate on the spherical member 26. Now, the mandrel section 29 is placed over the rod 28 and the mandrel 29 rests on the top surface of the cylindrical sleeve 27. Therefore, if the mandrel 29 is tipped, the cylindrical sleeve 27 rotates on the spherical member 26. The mandrel 29 is firmly anchored in position by means of four bolts 32. A suitable calibration instrument is also placed on the mandrel 29 as it is being tightened to insure proper alignment. The bolts 32 are further held in a firm and locked position by the insertion of the screws 37 into holes 35 and 36. By tightening the screws 37, the screws force the clips 30 and 31 even further against the bolt 32, thereby holding the mandrel 29 firmly in place.

The housing 11, with the rotating drive member 11 already connected to it, is then placed down over the mandrel 29. Four key ways 12d are formed in the cylindrical portion 12a and are aligned to receive the keys 39. The combination of the key 39 and key ways 12d properly align and orient the housing 11 onto the mandrel 29.

Prior to the insertion of the housing 11 over the mandrel 29, it is necessary to decide whether or not the extension member 56 is necessary. The apparatus 10 is versatile enough to be used for many different sized pipes. By utilizing the extension member 56, it is possible to work on pipes having a larger diameter without the necessary of using a different housing 11 and drive member 41. If no extension member is needed, the tool module 58 is positioned in the U-shaped channel of the head 52 by utilizing the gibs 64 and 64b as previously discussed. Also as previously discussed, the position of the tool module 58 may be regulated by the movement of the threaded shaft 63. If it is necessary to utilize the extension member 56, it is only necessary to bolt the extension member 56 to both end sections 55 by means of the screws 57. The tool module is then attached to the extension member 56 in a manner shown in FIG. 4 and as previously described for the head member 52.

The motor 15 is then connected to its power source and activated. The pinion gear 15b meshes with the bull gear 50 and rotation of the pinion gear 15b, when the motor 15 is activated, causes rotation of the bull gear 50. Since the bull gear 50 is connected to the base member 42, the entire member 42 also rotates. The base member 42 rotates and revolves on the bearings 46 and bearings 43. Since the head 52 is also connected to the base member 42, it also rotates in conjunction with the bull gear 50 and rotates on the bearings 54. The housing 11 and mandrel assembly 29 do not rotate.

Then, depending upon the type of cut which is to be made by the tool 59, the handle 81 is rotated to move the housing 11 and drive member 41 along the longitudinal axis of the shaft 28 and thereby allowing an axis of the pipe to be worked on. Further, the tool module may be moved in position by rotating shaft 63 to further adjust the type of cut being made.

Other modifications of the invention will be apparent to those skilled in the art in light of the foregoing description. This description is intended to provide specific examples of individual embodiments which clearly disclose the present invention. Accordingly, the invention is not limited to these embodiments or the use of elements having specific configurations and shapes as presented herein. All alternative modifications and variations of the present invention which follow in the spirit and broad scope of the appended claims are included.

I claim:

1. A portable pipe end preparation apparatus comprising:
   (a) a housing having a motor access opening and a central bore;
   (b) a motor cooperatively connected to said housing, said motor having a pinion gear for imparting a driving force;
   (c) a stationary mandrel assembly is positioned in said central bore, said mandrel assembly having a mandrel section and a base plate and said base plate having means to secure said base plate to an inner diameter of a pipe;
   (d) a rotating drive member rotatably mounted on said mandrel section, said drive member comprising:
      (i) a bull gear positioned to engage said pinion gear, said bull gear circuling said mandrel section;
      (ii) a base member cooperatively connected to said bull gear;
      (iii) first bearings means positioned between said mandrel section and said base member;
      (iv) a head member releasably and cooperatively connected to said base member;
      (v) second bearing means positioned between drive member and said housing; and
   (e) a tool module releasably mounted to said head member; and
   (f) said mandrel assembly comprising:
      (i) a base plate having a bore formed therein;
      (ii) a spherical member having a central bore and positioned on said base plate;
      (iii) a cylindrical shaft positioned in said bore of said base plate, said shaft having a bore;
      (iv) a cylindrical sleeve mounted for rotation on said spherical member;
      (v) a rod having a first end and an enlarged section end, said rod positioned in said bore of said cylindrical shaft, said enlarged end preventing said rod from exiting said bore of said cylindrical shaft;
      (vi) a mandrel section having a flange and said flange connected to said base plate, said flange of said mandrel section having an inner opening which is positioned on said cylindrical sleeve, whereby tilting of said sleeve results in tilting of said mandrel section.

2. The apparatus of claim 1, wherein said first bearing means comprises an upper bearing positioned between said mandrel section and said base member and a lower bearing positioned between said mandrel section and said head member.

3. The apparatus of claim 1, wherein said mandrel assembly further comprises a central shaft member having a thread top end and said housing having a top plate having a threaded opening, said shaft positioned in said threaded opening, whereby rotation of said top plate effects movement of said housing and drive member along an axis.

* * * * *